US010753056B2

(12) United States Patent
Saggiorato et al.

(10) Patent No.: US 10,753,056 B2
(45) Date of Patent: Aug. 25, 2020

(54) HYDRAULIC APPARATUS FOR SUPPLYING AN ASSEMBLY OF TRACK-SETTING DEVICES FOR A TRACKED VEHICLE, THE ASSEMBLY OF TRACK-SETTING DEVICES AND THE TRACKED VEHICLE

(71) Applicant: PRINOTH S.P.A., Vipiteno (IT)

(72) Inventors: Luca Saggiorato, Vipiteno (IT); Markus Unterholzner, Vipiteno (IT); Stefan Baier, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 93 days.

(21) Appl. No.: 16/090,989

(22) PCT Filed: Apr. 7, 2017

(86) PCT No.: PCT/IB2017/052022
§ 371 (c)(1),
(2) Date: Oct. 3, 2018

(87) PCT Pub. No.: WO2017/175194
PCT Pub. Date: Oct. 12, 2017

(65) Prior Publication Data
US 2019/0112769 A1    Apr. 18, 2019

(30) Foreign Application Priority Data

Apr. 7, 2016   (IT) .................. 102016000035948

(51) Int. Cl.
| *E01H 4/02* | (2006.01) |
| *F16H 61/40* | (2010.01) |
| *F15B 11/22* | (2006.01) |

(52) U.S. Cl.
CPC ............... *E01H 4/02* (2013.01); *F15B 11/22* (2013.01); *F16H 61/40* (2013.01);
(Continued)

(58) Field of Classification Search
CPC ..... E01H 4/00; E01H 4/02; F15B 7/005; F15B 11/22; F15B 11/16; F16H 61/40
(Continued)

(56) References Cited

U.S. PATENT DOCUMENTS

| 4,122,614 A | 10/1978 | Cheney |
| 6,029,450 A * | 2/2000 | Wittich .................. F15B 7/005 60/571 |

(Continued)

FOREIGN PATENT DOCUMENTS

| CN | 101918641 | 12/2010 |
| CN | 102162514 | 8/2011 |

(Continued)

OTHER PUBLICATIONS

Notification Concerning Submission, Obtention or Transmittal of Priority Document for International Application No. PCT/IB2017/052022 dated Jul. 4, 2017.

(Continued)

*Primary Examiner* — Robert E Pezzuto
(74) *Attorney, Agent, or Firm* — Neal, Gerber & Eisenberg LLP

(57) ABSTRACT

A hydraulic apparatus configured to supply track-setting devices for producing a cross-country skiing trail; the apparatus comprising: a first inlet configured to receive a fluid; a first outlet and a second outlet configured to release two flows of fluid; a first hydraulic coupling motor having a second inlet, a third outlet and a first shaft; and a second hydraulic coupling motor having a third inlet, a fourth outlet and a second shaft; wherein the second inlet and the third inlet are connected to the first inlet, and the first shaft and the second shaft are integrally connected to each other, the third outlet being connected to the first outlet, and the fourth outlet being connected to the second outlet.

7 Claims, 2 Drawing Sheets

(52) U.S. Cl.
CPC ............... *F15B 2211/40538* (2013.01); *F15B 2211/6313* (2013.01); *F15B 2211/6652* (2013.01); *F15B 2211/7058* (2013.01); *F15B 2211/7142* (2013.01); *F15B 2211/782* (2013.01)

(58) Field of Classification Search
USPC ............ 37/197, 219, 221, 223; 60/546, 571; 91/171, 189 R, 520, 536
See application file for complete search history.

(56) References Cited

U.S. PATENT DOCUMENTS

| | | | | |
|---|---|---|---|---|
| 7,299,569 | B2 * | 11/2007 | Kanzler | .................... E01H 4/02 37/197 |
| 8,413,353 | B2 * | 4/2013 | Wagger | .................... E01H 4/02 37/223 |
| 8,555,635 | B2 * | 10/2013 | Webster | .................. F15B 11/22 60/546 |
| 8,857,079 | B2 * | 10/2014 | Mueller | .............. F02D 41/0002 37/221 |
| 10,329,725 | B2 * | 6/2019 | Wagger | .................... E01H 4/02 |

FOREIGN PATENT DOCUMENTS

| | | |
|---|---|---|
| EP | 1245736 | 10/2002 |
| EP | 2468959 | 6/2012 |

OTHER PUBLICATIONS

Notification of Transmittal of the International Search Report and the Written Opinion for International Application No. PCT/IB2017/052022 dated Jul. 10, 2017.

Perry M. et al, "Lettuce Harvester features Dual Drive," Hydraulics and Pneumatics, Penton media, Cleveland, OH, vol. 63, No. 6, dated Jun. 1, 2010, pp. 28-31, XP001555986.

"Valves to go with the Flow," Motion System—Hydraulics & Pneumatics, Penton Media, Cleveland, OH, vol. 57, No. 2, dated Feb. 1, 2004, pp. 47-51, XP001190070.

Chinese Office Action and Search Report dated Mar. 2, 2020 for Application No. 201780002834.8 (11 pages).

* cited by examiner

HYDRAULIC APPARATUS FOR SUPPLYING AN ASSEMBLY OF TRACK-SETTING DEVICES FOR A TRACKED VEHICLE, THE ASSEMBLY OF TRACK-SETTING DEVICES AND THE TRACKED VEHICLE

PRIORITY CLAIM

This application is a national stage application of PCT/IB2017/052022, filed on Apr. 7, 2017, which claims the benefit of and priority to Italian Patent Application No. 102016000035948, filed on Apr. 7, 2016, the entire contents of which are each incorporated by reference herein.

TECHNICAL FIELD

The present disclosure relates to a hydraulic apparatus configured to supply an assembly of track-setting devices for a tracked vehicle, the assembly of track-setting devices comprising the hydraulic apparatus and a tracked vehicle comprising the hydraulic apparatus.

BACKGROUND

Certain tracked vehicles, in particular snow groomers, comprise a plurality of hydraulic pumps, each of which serves to supply a track or work device, such as, for example, a shovel, a main tiller or a winch. In general, a tracked vehicle comprises, amongst other things, at least two hydraulic pumps: one hydraulic pump that supplies the main tiller and the other hydraulic pump that supplies the winch.

Tracked vehicles are also used for making classic style cross-country skiing trails and, for such purposes, tracked vehicles are equipped with an assembly of track-setting devices. Each track-setting device comprises a sledge for forming the tracks for the cross-country skiing trail and an auxiliary tiller, smaller in size with respect to the main tiller. Auxiliary tillers have the task of tilling the snow after the snow has been tilled by the main tiller and before the sledge forms the tracks. An assembly of track-setting devices comprises a variable quantity of track-setting devices that is greater than 1, such as from 2 to 4.

One disadvantage of the known art is that to produce a classic style skiing trail the tracked vehicle comprises further hydraulic pumps to supply the auxiliary tillers of the assembly of track-setting devices and this entails an increase in weight of the tracked vehicle, an increase in bulk and increase in the cost of the tracked vehicle.

SUMMARY

The object of the present disclosure is to provide a hydraulic apparatus configured to supply an assembly of track-setting devices for a tracked vehicle that reduces at least one of the drawbacks of certain of the known art.

According to the present disclosure a hydraulic apparatus is provided for producing a cross-country skiing trail; the hydraulic apparatus comprising: a first inlet configured to receive a fluid; a first outlet and a second outlet configured to release two flows of fluid; a first hydraulic coupling motor having a second inlet, a third outlet and a first shaft; and a second hydraulic coupling motor having a third inlet, a fourth outlet and a second shaft; wherein the second inlet and the third inlet are connected to the first inlet, and the first shaft and the second shaft are integrally connected to each other, the third outlet being connected to the first outlet, and the fourth outlet being connected to the second outlet.

In accordance with the present disclosure, the hydraulic apparatus supplies a first outlet flow to the first outlet and a second outlet flow to the second outlet, where the first outlet flow and the second outlet flow have the same flow rate. As such, the first outlet and the second outlet can be used for supplying two different track-setting devices of the assembly of track-setting devices with relatively high performance. In other words, one of the hydraulic pumps of the tracked vehicle, for example the hydraulic pump for the winch, can be used to supply the assembly of track-setting devices with relatively high performance, in particular with performance comparable to the case in which the assembly of track-setting devices are supplied by separate hydraulic pumps. In accordance with the present disclosure, relatively greater versatility is achieved for the tracked vehicle, which can be used for various purposes without increasing the weight and/or bulk and with a relatively low cost.

Another object of the present disclosure is to provide an assembly of track-setting devices that reduces at least one drawback of certain of the known art.

According to the present disclosure, an assembly of track-setting devices is provided for producing a classic style skiing trail comprising: at least a first auxiliary tiller having a first hydraulic drive motor and a second auxiliary tiller having a second hydraulic drive motor; and a hydraulic apparatus as described herein wherein the first hydraulic drive motor is supplied by the first outlet and the second hydraulic drive motor is supplied by the second outlet.

Another object of the present disclosure is to provide a tracked vehicle that reduces at least one drawback of certain of the known art.

According to the present disclosure, a tracked vehicle, such as a snow groomer, is provided that comprises a hydraulic apparatus according to any one of claims 1 to 4, and a hydraulic pump that supplies the first inlet.

According to certain embodiments, the tracked vehicle comprises an assembly of track-setting devices as described herein and a hydraulic pump that supplies the first inlet.

Additional features are described in, and will be apparent from the following Detailed Description and the figures.

BRIEF DESCRIPTION OF THE DRAWINGS

Further characteristics and of the present disclosure will become clear from the description that follows of a non-limitative embodiment, referring to the figures in the accompanying drawings, in which.

DETAILED DESCRIPTION

Figure 1:
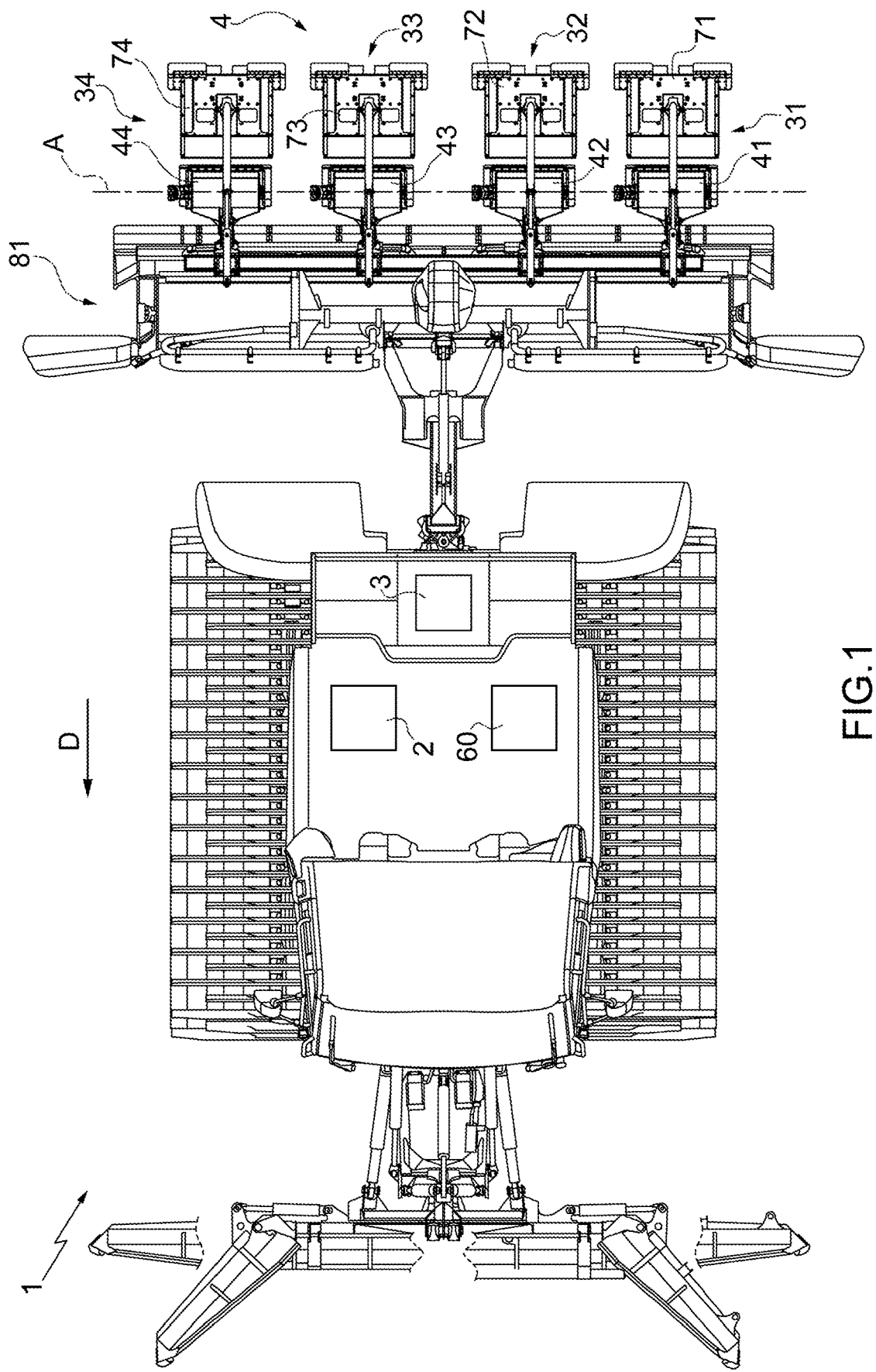
FIG. 1 is a top view of a tracked vehicle, in particular a snow groomer, made according to the present disclosure and equipped with an assembly of track-setting devices.
Figure 2:
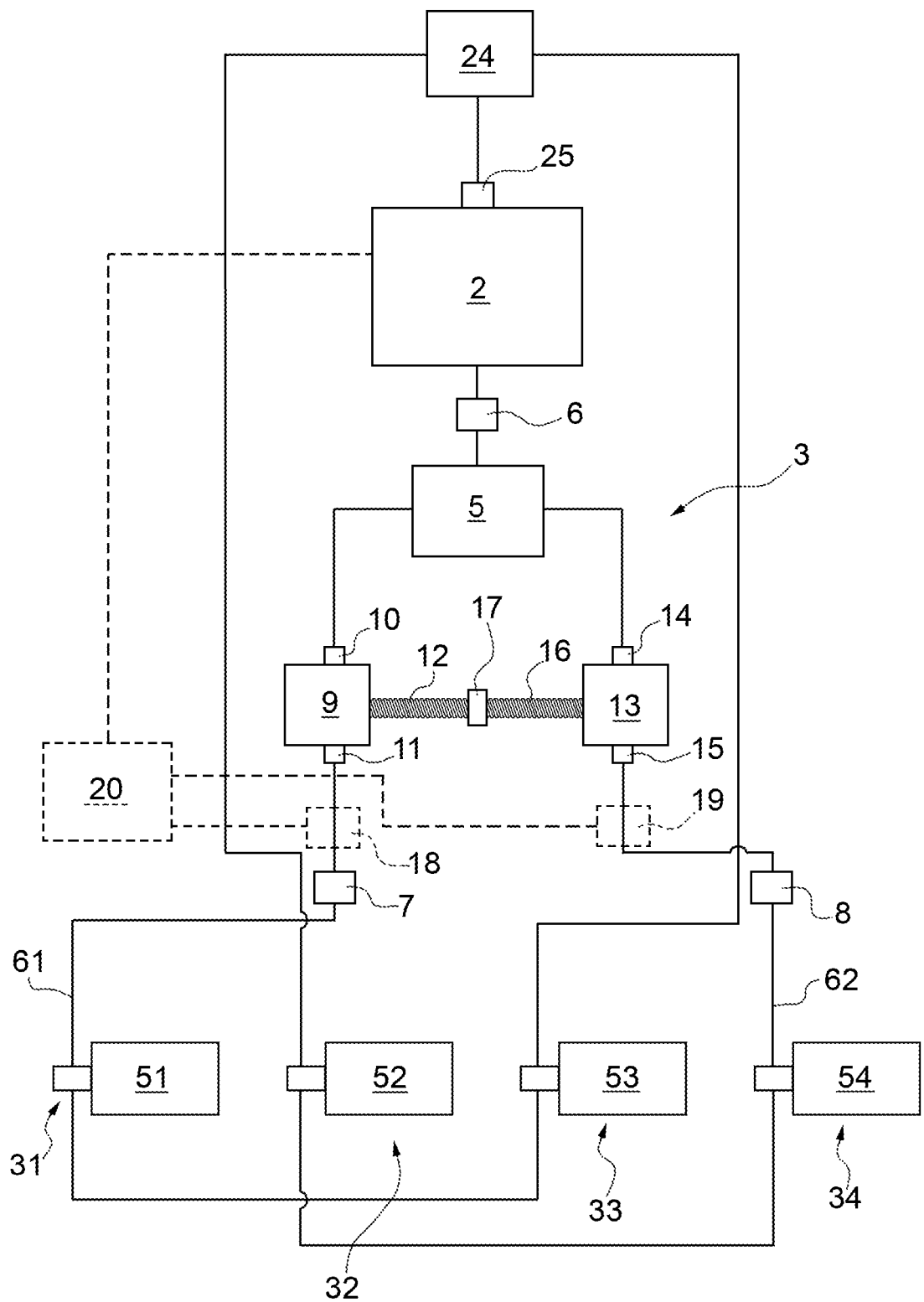
FIG. 2 is a schematic view, with parts removed for clarity, of a tracked vehicle made according to the present disclosure and equipped with a hydraulic apparatus and the assembly of track-setting devices.

Referring now to the example embodiments of the present disclosure illustrated in FIGS. 1 and 2, reference numeral 1 indicates a tracked vehicle, as a whole, in particular a snow groomer, comprising: a hydraulic supply pump 2; a hydraulic supply pump 60; a main tiller 81 supplied by the hydraulic pump 60; a hydraulic apparatus 3 and an assembly of track-setting devices 4 coupled to the hydraulic pump 2 by the hydraulic apparatus 3.

In the accompanying figures, the hydraulic apparatus 3 is mounted on a load-bearing structure of the tracked vehicle 1, but could also be mounted on a load-bearing structure of the assembly of track-setting devices 4.

The hydraulic pump 2 is a hydraulic pump that is configured and is generally used for supplying a winch of the tracked vehicle 1.

Referring to FIG. 2, the hydraulic apparatus 3 comprises: a hydraulic inlet 6 to receive an incompressible fluid; and a hydraulic outlet 7 and a hydraulic outlet 8 to release two flows of incompressible fluid having the same flow rate.

The hydraulic apparatus 3 also comprises: a hydraulic coupling motor 9 having an inlet 10, an outlet 11 and a shaft 12; and a hydraulic coupling motor 13 having an inlet 14, an outlet 15 and a shaft 16.

Hydraulic coupling motor 9 has the same technical specifications as hydraulic drive motor 13; in particular, hydraulic coupling motor 9 and hydraulic drive motor 13 are identical.

Furthermore, the inlet 10 of hydraulic coupling motor 9 and the inlet 14 of hydraulic coupling motor 13 are connected to inlet 6 of the hydraulic apparatus 3. In other words, hydraulic coupling motor 9 and hydraulic coupling motor 13 are supplied with an inlet flow to the hydraulic apparatus 3 that derives from hydraulic pump 2. In greater detail, the hydraulic apparatus 3 comprises a connector 5 having three ports that connect inlet 6 with inlet 10 and inlet 14. Connector 5 is, by way of non-limitative example of the present disclosure, a tee connector.

Furthermore, the shaft 12 of hydraulic coupling motor 9 and the shaft 16 of hydraulic coupling motor 13 are integrally connected to each other; in other words, shafts 12 and 16 are connected by connection 17. In this way, a flow rate of fluid leaving outlet 11 of hydraulic coupling motor 9 is the same as a flow rate of fluid leaving outlet 15 of hydraulic coupling motor 13.

Furthermore, outlet 7 of the hydraulic apparatus 3 is connected to the outlet 11 of hydraulic coupling motor 9; in other words, the outlet flow from outlet 7 is supplied from the outlet 11 of hydraulic coupling motor 9.

Furthermore, outlet 8 of the hydraulic apparatus 3 is connected to the outlet 15 of hydraulic coupling motor 13; in other words, the outlet flow from outlet 8 is supplied from the outlet 15 of hydraulic coupling motor 13. Therefore, the hydraulic apparatus 3 is configured such that a flow rate of fluid leaving outlet 7 of hydraulic apparatus 3 is the same as a flow rate of fluid leaving outlet 8 of hydraulic apparatus 3. In other words, the hydraulic apparatus 3 is able to supply two hydraulic appliances via a single hydraulic supply pump providing two identical flow rates, the hydraulic apparatus 3 consequently supplying two separate appliances with high qualitative parameters using a single hydraulic pump.

Referring to FIG. 2, the hydraulic apparatus 3 comprises a hydraulic pressure sensor 18 coupled to outlet 7 and configured to detect the pressure of the fluid at outlet 7; and a hydraulic pressure sensor 19 coupled to outlet 8 and configured to detect the pressure of the fluid at outlet 8.

The hydraulic pump 2 of the tracked vehicle 1 is a variable flow pump and supplies the inlet 6 of the hydraulic apparatus 3 with an incompressible fluid, for example oil.

The tracked vehicle 1 comprises a control unit 20 coupled to the variable flow hydraulic pump 2 to control the hydraulic pump 2 and coupled to pressure sensor 18 and pressure sensor 19.

The control unit 20 receives the pressure values at outlets 7 and 8 and adjusts the flow of the hydraulic pump 2 based on the received pressures.

In greater detail, the control unit 20 adjusts the flow of the hydraulic pump 2 so that one or both pressures at the outlets 7 and 8 do not exceed a pressure threshold value, such as the pressure threshold value of 400 bar.

In greater detail, the control unit 20 is configured to reduce the flow of the hydraulic pump 2 if at least one of the pressures at outlets 7 and 8 is greater than the pressure threshold value. In other words, during normal operation, the control unit 20 regulates the hydraulic pump 2 so that the hydraulic pump delivers its maximum flow and, in the case where control unit detects that at least one of the pressures at the outlets 7 and 8 is greater than the threshold value, reduces the flow of the hydraulic pump 2 with respect to the maximum flow to a first given or designated value.

If the at least one pressure that was greater than the threshold value drops below the threshold value, the control unit 20 keeps the flow at a first designated value for a certain time interval. After the certain time interval has passed and the at least one pressure has remained below the threshold value, the control unit 20 increases the flow of the hydraulic pump 2 to the maximum value.

Instead, if the at least one pressure that was greater than the threshold value still remains above the pressure threshold value, the control unit 20 then further reduces the flow of the hydraulic pump 2 until the at least one pressure drops below the designated pressure threshold value.

Outlets 7 and 8 supply the assembly of track-setting devices 4.

In greater detail, the assembly of track-setting devices 4 are configured for producing a classic style skiing trail and comprise a plurality of track-setting devices.

Referring to FIGS. 1 and 2, the assembly of track-setting devices 4 comprises a track-setting device 31, a track-setting device 32, a track-setting device 33 and a track-setting device 34.

Track-setting device 31 comprises a tiller 41 supplied by a hydraulic drive motor 51.

In addition, track-setting device 31 comprises a track-setting sledge 71 connected to tiller 41 so as to form tracks where the tiller 41 has worked the snow cover.

Track-setting device 32 comprises a tiller 42 supplied by a hydraulic drive motor 52.

In addition, track-setting device 32 comprises a track-setting sledge 72 connected to tiller 42 so as to form tracks where the tiller 42 has worked the snow cover.

Track-setting device 33 comprises a tiller 43 supplied by a hydraulic drive motor 53.

In addition, track-setting device 33 comprises a track-setting sledge 73 connected to tiller 43 so as to form tracks where the tiller 43 has worked the snow cover.

Track-setting device 34 comprises a tiller 44 supplied by a hydraulic drive motor 54.

In addition, track-setting device 34 comprises a track-setting sledge 74 connected to tiller 44 so as to form tracks where the tiller 44 has worked the snow cover. The tillers 41, 42, 43 and 44 are also called auxiliary tillers.

The tillers 41, 42, 43 and 44 are arranged in alignment along an axis A. Axis A is transverse, and in certain embodiments perpendicular, to a direction of forward movement D of the tracked vehicle 1.

Tiller 41 is adjacent to tiller 42.

Tiller 42 is placed between tiller 41 and tiller 43 along axis A.

Tiller 42 is placed between tiller 41 and tiller 44 along axis A.

Tiller 43 is placed between tiller 41 and tiller 44 along axis A.

Tiller 43 is placed between tiller 42 and tiller 44 along axis A.

Tiller 44 is adjacent to tiller 43.

Referring to FIG. 2, the assembly of track-setting devices 4 comprises a hydraulic line 61 and a hydraulic line 62.

Hydraulic line 61 connects hydraulic drive motor 51 with hydraulic drive motor 53. In consequence, hydraulic drive motor 51 and hydraulic drive motor 53 are connected in series.

Hydraulic line 62 connects hydraulic drive motor 54 with hydraulic drive motor 52. In consequence, hydraulic drive motor 54 and hydraulic drive motor 52 are connected in series.

The hydraulic apparatus 3 comprises a three-port connector 24.

In use, hydraulic line 61 is connected to outlet 7 of the hydraulic apparatus 3 upstream of the hydraulic drive motor 51.

In use, hydraulic line 61 is connected to the connector 24 of the hydraulic apparatus 3 downstream of the hydraulic drive motor 53.

In use, hydraulic line 62 is connected to outlet 8 of the hydraulic apparatus 3 upstream of the hydraulic drive motor 54.

In use, hydraulic line 62 is connected to the connector 24 of the hydraulic apparatus 3 downstream of the hydraulic drive motor 52.

The hydraulic pump 2 comprises an inlet 25 that, in use, is connected to connector 24.

In consequence, the hydraulic pump 2, the hydraulic apparatus 3 and the assembly of track-setting devices 4 are connected to one another by a closed hydraulic circuit.

The hydraulic connection in series of pairs of hydraulic motors corresponding to non-adjacent auxiliary tillers provides the advantage of having smaller pressure differences between the pressures in hydraulic lines 61 and 62 when, in certain circumstances, only some of the auxiliary tillers of the plurality of auxiliary tillers work the snow cover. In other words, there are certain working conditions in which it is required to form a quantity of cross-country skiing trails in the snow cover that is less than the maximum quantity of cross-country skiing trails definable with the assembly of track-setting devices 4. In this case, a quantity of track-setting devices are positioned in contact with the snow cover and the remaining quantity of track-setting devices are raised from the snow cover and are not in contact with the snow cover. In certain circumstances, two adjacent cross-country skiing tracks are required and it is therefore necessary that two adjacent track-setting devices work, which could be two lateral track-setting devices (i.e., track-setting devices 33 and 34 or track-setting devices 31 and 32), or two central track-setting devices (i.e., track-setting devices 32 and 33) according to the desired position of the cross-country skiing trails and, in consequence, of the tracks. In other cases, it is required that two cross-country skiing trails distant from one another are provided; in this case, it is required that the two track-setting devices at the ends work (i.e., track-setting devices 31 and 34).

In all of the above-mentioned cases, based on the connection in series of pairs of non-adjacent hydraulic motors and based on the two hydraulic motors associated with the end track-setting devices being connected on two separate lines, the loads on each of the two hydraulic lines 61 and 62 are comparable to each other and this reduces pressure imbalance between the two hydraulic lines 61 and 62, reducing wear on both the hydraulic lines 61 and 62 and the hydraulic apparatus 3.

Furthermore, referring to FIG. 1, the main tiller 81 extends for a dimension, such as a dimension calculated along axis A, larger than each dimension of extension of the auxiliary tillers 41, 42, 43 and 44.

In certain embodiments, the main tiller 81 extends for a dimension calculated along axis A larger than the sum of the dimensions of extension calculated along axis A of the auxiliary tillers 41, 42, 43 and 44. In other words, the main tiller 81 is configured to work a larger extension of the snow cover than each extension of the snow cover worked by the auxiliary tillers 41, 42, 43 and 44, and in certain embodiments greater than the sum of the extensions of the snow cover worked by the auxiliary tillers 41, 42, 43 and 44. Furthermore, the main tiller 81 is arranged in front of the auxiliary tillers 41, 42, 43 and 44 according to the direction of forward movement D. In other words, the main tiller 81 is interposed between a load-bearing structure of the tracked vehicle 1 and the assembly of track-setting devices 4.

Finally, it is evident that modifications and variants can be made with regard to the disclosure thus described without departing from the scope of the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An assembly of track-setting devices comprising:
a first auxiliary tiller having a first hydraulic drive motor;
a second auxiliary tiller having a second hydraulic drive motor; and
a hydraulic apparatus comprising
a first inlet configured to receive a fluid,
a first outlet and a second outlet configured to release two flows of the fluid,
a first hydraulic coupling motor having a second inlet, a third outlet and a first shaft, and
a second hydraulic coupling motor having a third inlet, a fourth outlet and a second shaft, wherein:
the second inlet of the first hydraulic coupling motor and the third inlet of the second hydraulic coupling motor are connected to the first inlet,
the first shaft of the first hydraulic coupling motor and the second shaft of the second hydraulic coupling motor are integrally connected to each other,
the third outlet of the first hydraulic coupling motor is connected to the first outlet,
the fourth outlet of the second hydraulic coupling motor is connected to the second outlet,
the first hydraulic drive motor is supplied by the first outlet, and
the second hydraulic drive motor is supplied by the second outlet.

2. The assembly of track-setting devices of claim 1, comprising a third auxiliary tiller and a third hydraulic drive motor, the third hydraulic drive motor being connected hydraulically, in series, with the first hydraulic drive motor, wherein the first auxiliary tiller, the second auxiliary tiller and the third auxiliary tiller are aligned along a first axis transverse to a direction of forward movement and the third auxiliary tiller is arranged between the first auxiliary tiller and the second auxiliary tiller.

3. The assembly of track-setting devices of claim 2, comprising a fourth auxiliary tiller and a fourth hydraulic drive motor connected hydraulically, in series, to the second hydraulic drive motor, wherein the fourth auxiliary tiller is aligned along the first axis and the fourth auxiliary tiller is arranged between the first auxiliary tiller and the third auxiliary tiller.

4. The assembly of track-setting devices of claim 1, comprising a track-setting sledge for each auxiliary tiller, wherein each the track-setting sledge is connected to the respective auxiliary tiller to form a plurality of tracks where the auxiliary tiller has worked a snow cover.

5. A snow groomer comprising:
  a hydraulic apparatus comprising:
    a first inlet configured to receive a fluid,
    a first outlet and a second outlet configured to release two flows of the fluid,
    a first hydraulic coupling motor having a second inlet, a third outlet and a first shaft, and
    a second hydraulic coupling motor having a third inlet, a fourth outlet and a second shaft, wherein:
      the second inlet of the first hydraulic coupling motor and the third inlet of the second hydraulic coupling motor are connected to the first inlet,
      the first shaft of the first hydraulic coupling motor and the second shaft of the second hydraulic coupling motor are integrally connected to each other,
      the third outlet of the first hydraulic coupling motor is connected to the first outlet, and
      the fourth outlet of the second hydraulic coupling motor is connected to the second outlet; and
  a hydraulic pump that supplies the first inlet.

6. A snow groomer comprising:
  an assembly of track-setting devices comprising:
    a first auxiliary tiller having a first hydraulic drive motor,
    a second auxiliary tiller having a second hydraulic drive motor, and
    a hydraulic apparatus comprising
      a first inlet configured to receive a fluid,
      a first outlet and a second outlet configured to release two flows of the fluid,
      a first hydraulic coupling motor having a second inlet, a third outlet and a first shaft, and
      a second hydraulic coupling motor having a third inlet, a fourth outlet and a second shaft, wherein:
        the second inlet of the first hydraulic coupling motor and the third inlet of the second hydraulic coupling motor are connected to the first inlet,
        the first shaft of the first hydraulic coupling motor and the second shaft of the second hydraulic coupling motor are integrally connected to each other,
        the third outlet of the first hydraulic coupling motor is connected to the first outlet,
        the fourth outlet of the second hydraulic coupling motor is connected to the second outlet,
        the first hydraulic drive motor is supplied by the first outlet, and
        the second hydraulic drive motor is supplied by the second outlet, and
    a hydraulic pump that supplies the first inlet.

7. The snow groomer of claim 6, comprising a main tiller that extends for a larger dimension than each dimension of extension of each of the auxiliary tillers and that is configured to work an extension of snow cover greater than each extension of snow cover worked by the auxiliary tiller, wherein the main tiller is arranged in front of the auxiliary tillers in accordance with a direction of forward movement of the snow groomer.

* * * * *